April 4, 1961    F. F. WELCH    2,977,635
PROCESS FOR TINTING ART OBJECTS
Filed May 9, 1958

INVENTOR.
Felix F. Welch
BY Whitehead, Vogl & Lowe
PER *Frank C. Lowe*
Attorney

United States Patent Office 2,977,635
Patented Apr. 4, 1961

2,977,635
PROCESS FOR TINTING ART OBJECTS
Felix F. Welch, San Angelo, Tex., assignor to Edith E. Miller, Denver, Colo.
Filed May 9, 1958, Ser. No. 734,219
3 Claims. (Cl. 18—47.5)

This invention relates to methods for coloring and tinting art objects such as statuettes, figurines, bric-a-brac and the like, and more particularly to the application of a base color or tint to such art objects which are made of cast plaster.

There is a large and ever increasing demand for low-cost bric-a-brac, figurines and like art objects for many decorative purposes. Plaster of Paris and other quick setting types of plaster, hereinafter referred to as "plaster," are ideal for producing such decorative art objects which will be hereinafter referred to as "figurines."

With the widespread use of rubber-like plastic substances which may be obtained in liquid form and may be easily plasticised or set to a solid having rubber-like properties, there has been a gradual development of improved rubber molds for plaster casting and such rubber molds permit the manufacture of precise plaster casts of figurines without the problems arising in common rigid molds such as separation, undercuts and parting lines. Delicate art objects may be copied with amazing accuracy of detail. A rubber mold may be formed upon a prototype such as the body of a coiled snake and the resulting plaster casts, which may be used as figurines or decorative ash trays, will duplicate the natural form of the snake in minute detail.

While it is thus possible to form low-cost, high-quality plaster figurines, there is nevertheless the problem of tinting and coloring these figurines. Where it is essential that a figurine be produced in quantity and for a low cost, the tinting and coloring of the figurine may become the major item of expense. It is often impossible to give the time and skill required to properly tint and paint a figurine to produce a high quality product. As a result quantity produced plaster figurines usually have a characteristic cheapness of appearance despite improved molding techniques.

Therefore, the primary object of the present invention is to provide a novel and improved method for tinting and applying a background or base coloring to plaster figurines. It follows that other objects of the invention are to provide such novel and improved method for tinting and applying base coloring of plaster figurines which: (a) incorporates in the figurine a base color with natural gradations of shading and highlights in correspondence with the undulations and surface variations of the figurine; (b) effects a natural shading contrast between contour breaks and concave and convex portions of the surface of the figurine; (c) permits an unskilled worker to color a plaster figurine with a base color having natural gradations of shading and highlights between contour changes and concave and convex portions of the surface; (d) permits an application of shaded and highlighted base color to a figurine in a quick simple manner; and (e) is an effective, reliable, low-cost, quick and easy operation especially suited to production methods.

With the foregoing and other objects in view, all of which more fully hereinafter appear, my invention comprises certain novel and improved operations, manipulations and steps as hereinafter described in detail, defined in the appended claims, and illustrated in part in the accompanying drawing, in which:

The use of quick-setting calcined gypsum or plaster of Paris for making plaster figurines involves mixing the powdered plaster with a selected amount of water and pouring the mixture in a mold before the plaster sets. Once set, the mold is stripped off the figurine. The figurine is then set aside to dry, for while a substantial part of the water mixed with the plaster is used up in hydrating the gypsum, some of the water is encased in the pores of the figurine. This moisture will eventually evaporate although such process may take several days. Once dried and fully set, the plaster mold will readily absorb water and become rewetted.

Figure 1:
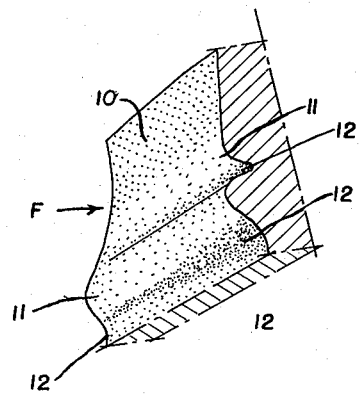
Figure 1 represents a fragment of a figurine illustrating the representative surfaces that require highlights and shading.
Figure 2:
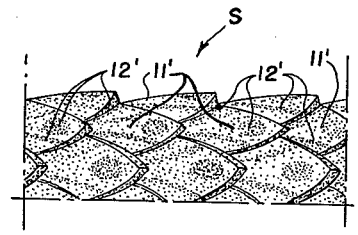
Figure 2 represents a fragment of another type of figurine illustrating complex surfaces which require highlighting and shading.

Referring to Fig. 1 of the drawing, the fragment F of a figurine includes an undulating surface with a flat portions 10, convex surfaces 11 and concave surfaces 12, such being representative of the surface variations of a conventional figurine. In nature, the pattern of the shading of the base color on the surfaces of natural objects is the same in almost every instance. The color tone on the flat portions 10 is substantially uniform, the color on the convex portions 11 is of a lighter shade than that on the flat portions and the color on the concave portions 12 is substantially darker than that on the flat portions. This highlighted and shaded pattern remains the same even in the intricate patterns that natural objects present. Figure 2 represents portions of a scalar object which has overlapping scales S, similar to the scales on the body of a serpent. While such an object may be effectively and relastically cast by rubber molds, it is difficult to obtain a shade variation of the base color. Even in a complex natural form such as the scaled body at Fig. 2, there is a variation of light color at the convex portions 11' to dark color at the concave portions 12' on each scale.

To apply such coloring on each scale with a brush, in a uniform variable manner and without unsightly blotches is an almost impossible task and where a mass production of figurines is needed, the expense is prohibitive. Other conventional methods of applying color as by the use of a paint spray gun or staining are also unsatisfactory because the color is then applied uniformly.

With such in view, the present invention was conceived and developed and comprises, in essence, a method for applying a base color to a figurine including the step of dipping a newly-cast plaster figurine in a water-base paint which is in the nature of a water color wherein the color element is carried in the water as a suspension or dispersion of minute particles which are discrete and not in solution although they may be colloidal in their nature. Soluble colors such as dyes cannot be used.

The depth or intensity of the selected base color over the white plaster figurine can be varied from a pastel to a substantially solid color by varying the amount of color particles in the water from a thin suspension to a thick, soupy suspension. The time the figurine remains immersed in the color suspension will effect the degree of contrast. The desirable time period of immersion is relatively short, but experiments can quickly permit the best time to be ascertained for clearly distinctive contrasting shades between the convex and concave surfaces Obviously, too great a time period will cause the color to be uniform and the shading effect lost.

It is essential that the plaster figurines be newly cast and still moist and that they are not permitted to dry out before they are immersed in the color liquid. It would seem that a plaster figurine would reabsorb water and become wetted to be in substantially the same condition as it was before it was originally dried; however, it was discovered that the surface of a dried figurine will not become wetted as easily or absorb water as uniformly as a newly cast figurine. It was further discovered that when a dry figurine was rewetted, there would be a slight dissolving and sliming up of the plaster which changes the porosity of the plaster. The slight resistance to rewetting and the tendency of the plaster surface to slime once the figurine has dried is hardly noticeable, but it is critical and limits my coloring process to only newly-cast plaster figurines.

Actually, the action of applying a contrasting base color to a figurine in accordance with my process is not fully understood, but it is apparent that the newly-cast, damp figurine has almost perfect affinity to wetting and although not dry, it will absorb additional water. Moreover, the structure of the newly-cast and set plaster is almost perfectly homogeneous and it will absorb water into its body from a surface at a uniform rate. A layer of color is deposited on the surface of the figurine as this absorption occurs. The high wetting affinity of a damp, newly-cast figurine permits the figurine to be dipped and withdrawn from the color liquid without forming drops or blotches on its surface, especially in sharp inside corners where drops would otherwise tend to form.

Figure 3:
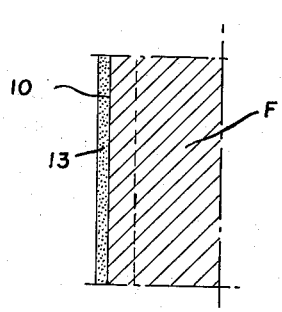
Figure 3 represents a sectional detail of a fragment of a flat surface portion of a figurine, on a greatly enlarged scale, diagrammatic in nature and illustrating the uniform manner in which color affixes itself to the flat surface when applied in accordance with the principles of the invention.
Figure 4:
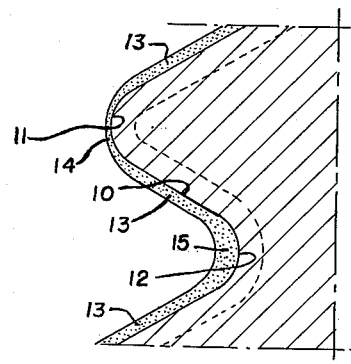
Figure 4 represents a sectional detail of a fragment of a convex-concave portion of a figurine, on a greatly enlarged scale, diagrammatic in nature and illustrating the varied manner in which color affixes itself to the convex and concave surfaces when applied in accordance with the principles of the invention.

The amount of color deposited on the surface of the figurine is obviously a function of the amount of water absorbed from the color liquid into the plaster of the figurine. Referring to Fig. 3, the color is deposited as a layer 13 on the flat surface 10 of the figurine as the water is absorbed into the body of the figurine. The thickness of the layer 13 depends upon the amount of water moving into the figurine since the particles of color carried by that particular amount of water must be deposited as a layer at the surface of the figurine since they cannot flow into the plaster with the water. On the flat surface 10 represented at Fig. 3, the movement of water into the plaster is substantially regular and uniform and it follows that the thickness of the layer of color 13 is likewise substantially uniform and the base color will be uniform across this flat surface.

Where a concave or convex surface 11 occurs, such as illustrated at Fig. 4, the absorption rate of water into the plaster will be disrupted according to the degree of curvature of the surface. At the convex point 11 the water absorption into the body of the plaster is towards a focal point and this convergence of water movement into the plaster limits the amount of color that can be deposited on the surface of the figurine. The layer of color 14 at the convex point will thus be substantially thinner than the layer 13 on the flat surface and the thinner layer of color will naturally be of a lighter shade than the flat surface portion since the plaster base of the figurine is white. The result is a distinctive and naturally characteristic highlight on the figurine.

On the other hand, at the concave surface 12 the water absorption is into a greater plaster mass without restriction and the diverging water movement into the plaster permits the deposit of a thicker layer of color than could otherwise be deposited. The results is a shaded portion of the figurine 15 compared with the flat surface.

It appears essential in the operation of my process that the figurine have a homogeneous surface, be of a homogeneous structure, have wetting affinity to the color liquid so that absorption of the color liquid into the plaster will be rapid and uniform without any initial wetting of the surface. It is further essential that the color liquid contain the color element as solid particles in suspension which will be deposited onto the surface of the figurine.

I have described my invention in considerable detail which will enable those skilled in the art to practice the same. However, it is to be recognized that others skilled in the art may devise alternate and equivalent steps and operations which are within the scope and spirit of my invention. Hence, I desire my protection to be limited not by the constructions and details illustrated, but only by the proper scope of the appended claims.

I claim:

1. A method for the application of a shaded base color to a figurine of fine uniform porosity having convex and concave surfaces wherein the convex surfaces are of a light shade and the concave surfaces are of a darker shade, including the steps of dipping the figurine into a color solution wherein the fluid element is adapted to be absorbed into the pores of the figurine and the color element is carried in the solution as a suspension and for a time period sufficient but not exceeding that required to permit a variation of the deposit of color with a minimum deposit on the convex surfaces and a maximum deposit on the concave surfaces.

2. The method defined in claim 1, wherein the figurine is plaster of Paris and the figurine is immersed in the color solution when it is freshly cast and retains the moisture of initial set.

3. In combination with the preparation of a plaster of Paris figurine having convex and concave surfaces, including the steps of mixing plaster of Paris with water to obtain a quick setting fluid, pouring the fluid into a mold and removing the figurine from the mold when set, and including the further steps of surface tinting the figurine to obtain a light shade on the convex surfaces and a darker shade on the concave surfaces by immersing the same in a water base color carrying the color constituent as a suspension, said immersion being shortly after the figurine is stripped from the mold and while it is still wet and for a limited time period sufficient but not exceeding that required to form a variable color deposit on the figurine with minimum deposit on the convex surfaces and maximum deposit on the concave surfaces.

References Cited in the file of this patent
UNITED STATES PATENTS

| Number | Name | Date |
|---|---|---|
| 525,024 | Moreau | Aug. 28, 1894 |
| 1,151,701 | Macnichol | Aug. 31, 1915 |
| 1,937,484 | Bogin | Nov. 28, 1933 |
| 2,046,954 | LaVerne et al. | July 7, 1936 |
| 2,208,494 | Broderson | July 16, 1940 |
| 2,470,918 | Chung | May 24, 1949 |